(12) United States Patent
Luong

(10) Patent No.: US 9,174,648 B2
(45) Date of Patent: Nov. 3, 2015

(54) SYSTEM FOR USING SHORT TEXT MESSAGING FOR REMOTE DIAGNOSTIC

(71) Applicant: NXP B.V., Eindhoven (NL)

(72) Inventor: Jean-Luc Luong, Caen (FR)

(73) Assignee: NXP B.V., Eindhoven (NL)

( * ) Notice: Subject to any disclaimer, the term of this patent is extended or adjusted under 35 U.S.C. 154(b) by 8 days.

(21) Appl. No.: 14/163,652

(22) Filed: Jan. 24, 2014

(65) Prior Publication Data

US 2015/0210288 A1 Jul. 30, 2015

(51) Int. Cl.
 *G07C 5/00* (2006.01)
 *B60W 50/00* (2006.01)
 *H04L 12/58* (2006.01)
 *H04L 29/08* (2006.01)

(52) U.S. Cl.
 CPC .............. *B60W 50/00* (2013.01); *G07C 5/008* (2013.01); *H04L 51/046* (2013.01); *H04L 67/125* (2013.01)

(58) Field of Classification Search
 None
 See application file for complete search history.

(56) References Cited

U.S. PATENT DOCUMENTS

| | | | |
|---|---|---|---|
| 5,299,132 A * | 3/1994 | Wortham | 455/457 |
| 8,731,155 B2 * | 5/2014 | Chesnutt et al. | 379/102.01 |
| 2004/0203634 A1 * | 10/2004 | Wang et al. | 455/414.1 |
| 2008/0113677 A1 * | 5/2008 | Madnawat | 455/466 |
| 2009/0096596 A1 * | 4/2009 | Sultan et al. | 340/426.13 |
| 2009/0167524 A1 * | 7/2009 | Chesnutt et al. | 340/539.19 |
| 2013/0211623 A1 * | 8/2013 | Thompson et al. | 701/2 |

* cited by examiner

*Primary Examiner* — Thomas Tarcza
*Assistant Examiner* — Richard Goldman

(57) ABSTRACT

A system incorporated in a vehicle is disclosed. The system includes a communication system including a text messaging communication hardware to receive a message via a text messaging service. The message includes a command. The system also includes a microcontroller, coupled to the communication system and a machine control system, to execute the command through the machine control system. The machine control system is configured to control components of the vehicle. The microcontroller is configured to determine if a configuration allows execution of the received command and to return a response to the communication system.

16 Claims, 2 Drawing Sheets

SYSTEM FOR USING SHORT TEXT MESSAGING FOR REMOTE DIAGNOSTIC

BACKGROUND

With mass production of mobile phone related components and systems, it has become economically feasible to explore other uses of mobile phone technology beyond its well-known typical use, that is, for person to person conversations and Internet browsing. In addition, text messaging is also a popular use of mobile phones. Text messaging is universally available in that text messaging services are offered by virtually all commercial mobile service providers. Text messaging is also referred to as Short Message Service (SMS). Standards related to SMS are defined by Global System for Mobile Communications (GSM) series of standards. These standards limit the message size to 160 characters. The standards also allow sending larger messages using multipart sub-messages each of them are limited to 160 characters.

In recent years, automobiles and many different types of machines are being equipped with sophisticated electronics controls. Many newer automobiles include one or more microcontrollers, variety of electrical and electronic sensors and control software that control and monitor internal operations of these automobiles. In addition, these electronics systems also collect a variety of information through sensors for diagnostic purposes. Some informational data is also collected. For example, temperatures at different locations inside the engine compartment and/or cabin are collected by automobile control systems. Error conditions and occurrence of faults are another set of information that is actively collected by automobile or machine control systems. Typically, a special data reader is connected to a special interface (e.g., On Board Diagnostic or OBD) provided inside an automobile to retrieve at least some of the collected data from an automobile control system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system incorporated in a vehicle is disclosed. The system includes a communication system including a text messaging communication hardware to receive a message via a text messaging service. The message includes a command. The system also includes a microcontroller, coupled to the communication system and a machine control system, to execute the command through the machine control system. The machine control system is configured to control components of the vehicle. The microcontroller is configured to determine if a configuration allows execution of the received command and to return a response to the communication system.

In another embodiment, a method is disclosed. The method includes receiving a message, wherein the message includes a request for performing an operation, determining if the request is sent by an authorized sender, determining if a configuration allows execution of the operation through a control system that is embodied in a vehicle, upon determining that the request is sent by the authorized sender the configuration allows the execution of the operation, performing the operation through the control system that is configured to monitor and control components of the vehicle, and sending results of the operation back to the authorized sender in form of a Short Messaging Service (SMS) message.

In yet another embodiment, a computer program product comprising program code stored in a computer readable medium other than a signal per se, the program code being executable by a processor of an automobile control system to cause the automobile control system to implement an operation, the operation comprising. The operation includes receiving a message, wherein the message includes a request for performing an operation, determining if the request is sent by an authorized sender, determining if a configuration allows execution of the operation through a control system that is embodied in a vehicle, upon determining that the request is sent by the authorized sender the configuration allows the execution of the operation, performing the operation through the control system that is configured to monitor and control components of the vehicle, and sending results of the operation back to the authorized sender in form of a Short Messaging Service (SMS) message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Computing systems built into modern automobiles collects variety of information as for example, status of components that require regular service or replacement, error conditions and more. A user or operator of an automobile can benefit if the user can communicate with the automobile without using specialized equipment or readers. The benefits are ever greater if this communication can take place remotely. While the word "automobile" is being used to describe various aspects of the invention, it should be noted that the embodiments described herein may also be applicable to other types of machines, such as a manufacturing system.

The use of text messaging or SMS offers many advantages over the use of the Internet for the type of remote communication described herein. First, implementing the Internet communication requires additional hardware and software, thus increasing cost. Second, the Internet communication requires a real time connection that may not be available if the automobile is located in a remote location or where there is no Internet connectivity, whereas text messaging can work offline in that a request for information may be transmitted without knowing anything about the status of the automobile.

Further, the Internet service is expensive and typically requires monthly subscription charges whereas text messaging is typically charged at peruse basis or may be available for free as a part of a regular phone service subscription. Operations of text messaging transmission and underlying systems are well known, therefore, in order not to obfuscate the present disclosure, a detailed discussion of Short Messaging Service (SMS) or text messaging service is being omitted.

Figure 1:
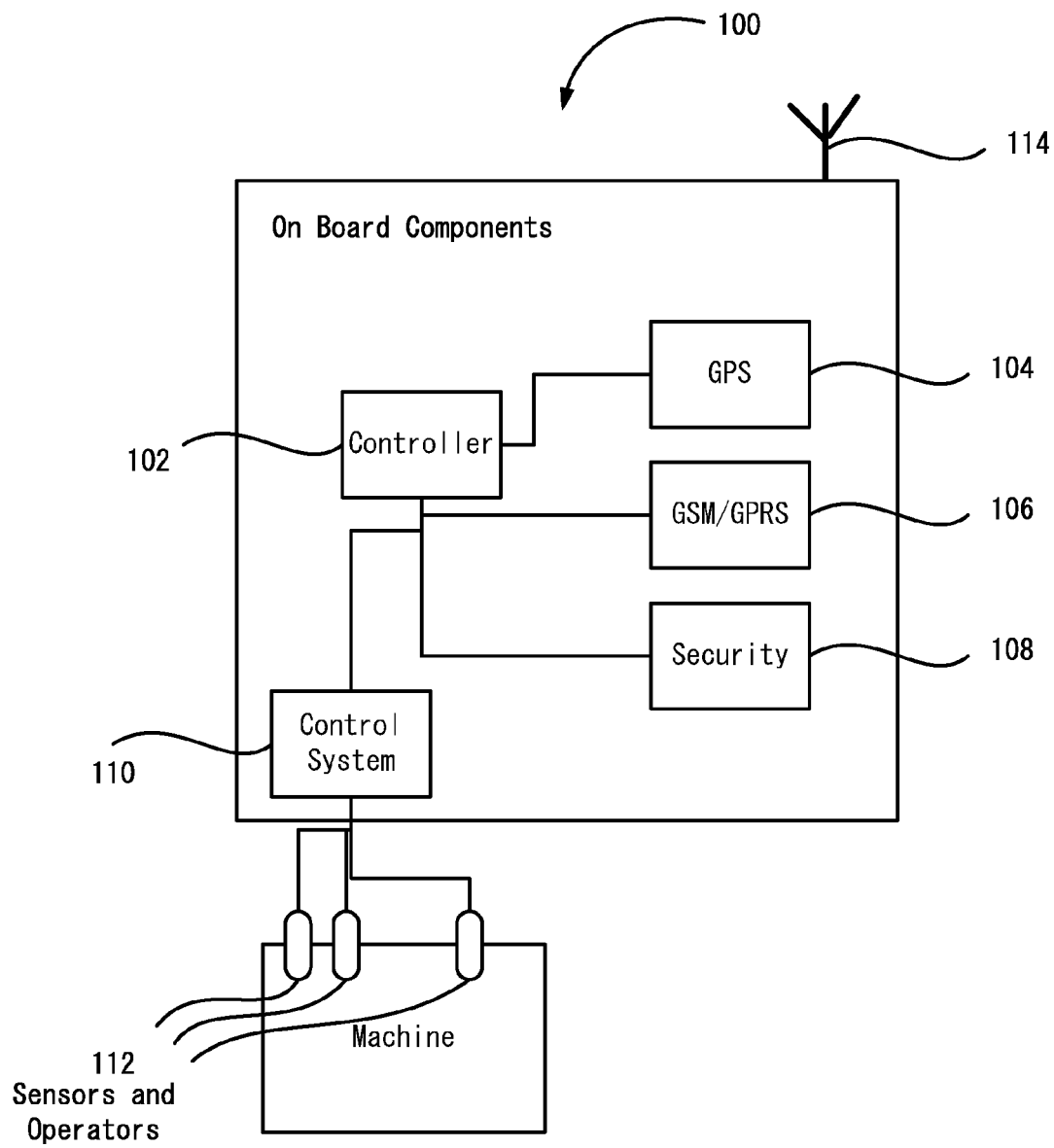
FIG. 1 is an exemplary block diagram showing on board components of an automobile control system in accordance with an embodiment of the present disclosure.

FIG. 1 discloses an exemplary diagram broadly showing various on board components of an automobile control system 100. The automobile control system 100 may include a Global Positioning System (GPS) hardware 104 to provide location data. A Global System for Mobile Communication/General Packet Radio Service (GSM/GPRS) hardware 106 is also included in the automobile control system 100. A security module 108 may also be included to track stolen or lost automobile or to provide security related services to GSM/GPRS hardware 106.

In one embodiment, the GPS hardware 104 and the GSM/GPRS hardware 106 may be fabricated inside a same integrated circuit (e.g., in a same chip). In another embodiment, the security module 108 may also be included in the same chip. A controller 102 is provided to control and synchronize operations of the included hardware. In an embodiment, the controller 102 may also be fabricated in the same chip as the GPS hardware 104 and the GSM/GPRS hardware 106. Alternatively, the controller 102 and the GSM/GPRS hardware 106 may be fabricated in a same chip while the GSM hardware 104 is fabricated in a separate chip.

The controller 102 includes a processor to execute programming instructions based on pre-set configurations and collected data. The controller 102 may collect messages or data from other system components such as the GPS hardware 104, the GSM/GPRS hardware 106, etc. The controller 102 is also coupled to a control system 110 that controls various functions and systems of a machine such as an automobile. In another embodiment, a plurality of control systems may be provided to control or operate different parts and sub-systems of the automobile. For example, a first control system may be provided for the drive train and a second control system may control for the remaining systems such as anti-lock brakes, fuel injection, etc. In one embodiment, the control system 110 and the controller 102 may be combined into one processing unit and may be fabricated together on a same board or alternatively, on the same chip.

In one embodiment, the control system 110 is connected to one or more sensors and operators 112 that are mounted on or inside the machine. For example, a sensor 112 may be used for sensing coolant temperature and another sensor may be used for monitoring fluid level of a fluid used in the machine. The operators may be used to drive various parts of the machine based on instructions received from the control system 110. For example, an operator may be used to control fuel injection, another operator may be used to activate anti-lock braking system when instructed by the control system 110.

In one embodiment, the GSM/GPRS hardware 106 includes a feature to allow the user of the automobile to insert a smart card (e.g., a SIM card). A smart card is typically used for carrying an identification number unique to a GSM hardware and storing personal data. The operations of the GSM hardware 106 are prevented if the smart card is removed. In another embodiment, in which a Code Division Multiple Access (CDMA) service is used, the GSM hardware 106 may be activated to use the CDMA mobile network using a special identifier associated with the GSM hardware 106. Once a smart card is inserted and the mobile service is activated, the GSM hardware 106 is able to communicate with other phones via the text messaging service. In one embodiment, the automobile control system 100 may also include an antenna 114 to enable various components to connect with radio waves for the purpose of communicating with external networks and devices.

In some embodiments, instead of using a separate smart card i.e., a subscriber identity module (SIM) card) for the GSM/GPRS hardware 106, the user may be allowed to couple his phone to the GSM/GPRS hardware 106 using standard communication interfaces such as Bluetooth or Wi-Fi. A connector may also be provided in the car to enable the user to dock his phone to couple the phone to the GSM/GPRS hardware 106. In these embodiments, the GSM/GPRS hardware 106 uses the identity and network services of the user's phone.

Figure 2:
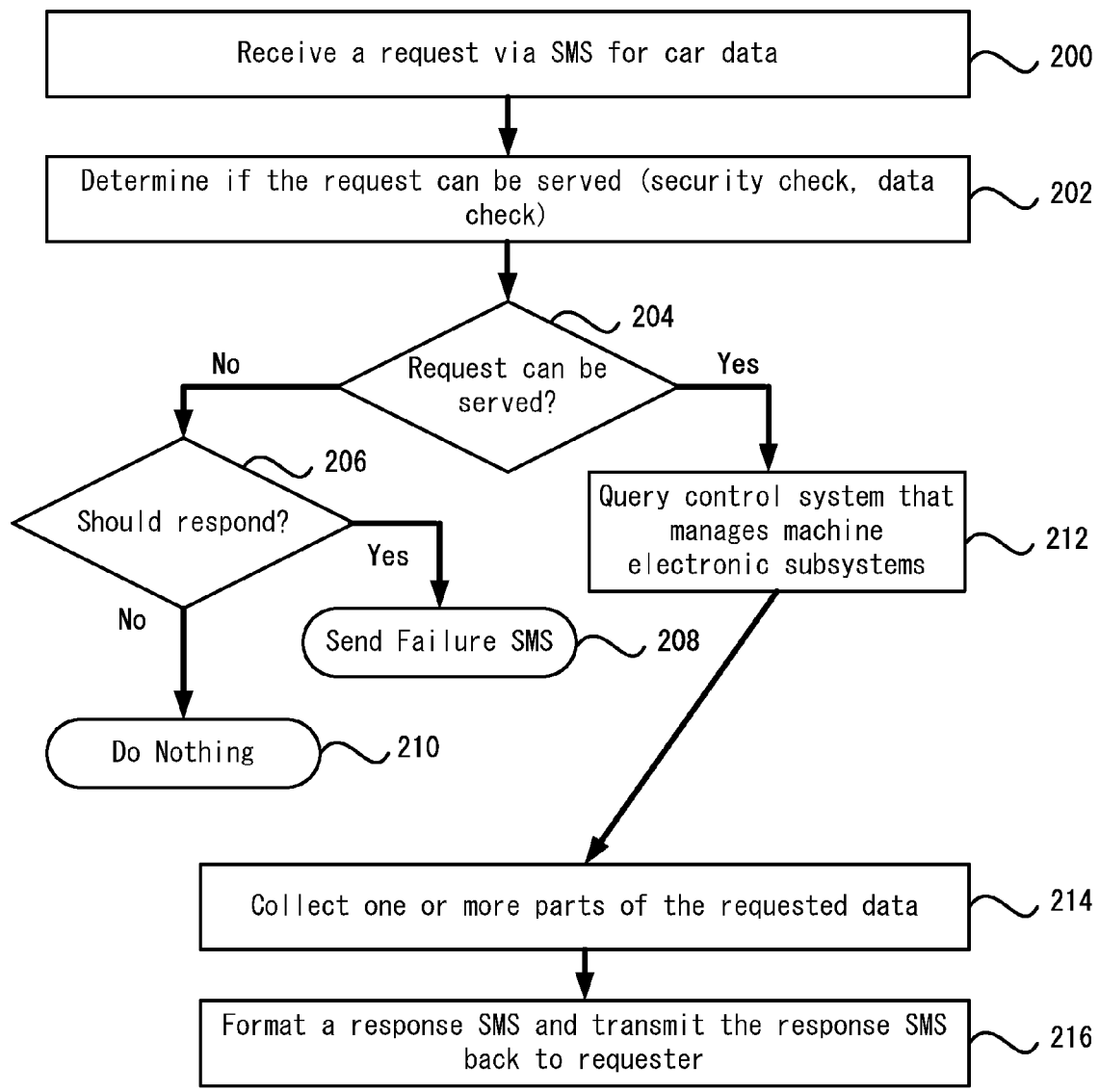
FIG. 2 illustrates an exemplary flow diagram illustrating operations of communicating with the automobile control system via text messaging in accordance with an embodiment of the present disclosure.

FIG. 2 illustrates an exemplary flow diagram to illustrate operations of communicating with the automobile control system 100 via text messaging to obtain data (such as diagnostic data) or to send control commands (such as perform diagnostic or turn on/off a system in the machine, turn on/off the machine). Accordingly, at step 200, the GSM/GPRS hardware 106 receives a request from an external phone or device via text messaging. The received data includes a request for informational or diagnostic data. The informational data may include information such as engine temperature, fluid levels, tire pressure, whether car doors are locked/unlocked, whether doors are open or closed, whether car windows are up or down, fuel in the fuel tank, mileage the car can run in the remaining fuel, position of the car, external temperature, cabin temperature, miles to filter change, miles to brake pads change, etc. It should be noted that the controller 102 may be programmed to provide support for other user defined data depending on the available features of the automobile. The request is limited to 160 characters. For security purposes, the data in the request may be encoded that can be decoded or parsed by the controller 102.

At step 202, the request is passed through the security module 108 to ascertain that the request is originated form an authorized user or device. The controller 102, with the help of the security module 108 or programmable instructions set in the controller 102, may execute a pre-configured security rule on the received request to ascertain if the request is from an authorized sender. In one embodiment, however, the controller 102 may be programmed to serve requests for at least some types of data without an authorization check or when the authorization fails. At step 204, the controller 102 also determines if the request can be served based on the configuration of the controller 102. In one embodiment, the request may include an identifier to enable the security module 108 to identify the requester. In another embodiment, the phone number of the sender of the request may be used for ascertaining if the request is from an authorized source. Alternatively, upon receiving a request, the controller 102 may send a challenge back to the sender via text messaging and if the sender sends back a valid code in response to the challenge code, the controller 102 assumes that the request is from an authorized sender. In another embodiment, in addition to a command, a request may also include a secret code that the controller 102 can match with stored codes of authorized users. If at step 204, the controller 102 determines that the request cannot be served, at step 206, based on a configuration, the controller 102 determines if a response shall be sent. For example, if the request includes matter that does not resemble as a command that the controller 102, a response may not be sent back. At step 210, for example, if the request does not include at least one keyword that a valid command should include, the controller 102 may not respond to the request. Otherwise, at step 208, the controller 102, via the GSM/GPRS hardware 106, sends a failure message back to the sender.

Going back, if at step 204, the controller 102 makes a determination, based on the configuration and programming modules of the controller 102, at step 212, the controller 102 queries the control system 110 to retrieve data that is needed for serving the request.

In one embodiment, a command in the request includes a predefined structure. For example, the request will include a text "GET EXT TEMP" or "GET POSITION" or "PERORM AC ON" or "PERFORM AC OFF", etc. It should be noted that the controller 102 may be configured to use different keywords and commands as determined by the programmer of the controller 102.

In one embodiment, in addition to request data from the controller 102, a sender of the request may also execute other operations. For example, the exemplary request "RUN DIAG" would instruct the controller 102 to perform predefined diagnostic procedures and return the result back to the sender of the request.

At step 214, the controller 102 runs a pre-programmed routine of the received request using the data retrieved form the control system 110 and data available to the controller 102 through a configuration. At step 216, the controller 102 formats a response to the request and transmits the response back to the sender as a text message via the GSM/GPRS hardware 106. If the response is more than 160 characters long, the response is broken up into multiple messages, each including less than or equal to 160 characters.

In one embodiment, if an error is encountered during steps 212 or 214, the controller 102 sends back a predefined error message including a brief description of the error.

Going back to step 208, if the controller 102 determines that the request is invalid, the controller 102 may send a list of valid commands to the sender via one or more text messages. Also, if a sender sends multiple commands in one request or in many requests successively, the controller 102 may provide one single response to all commands.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed. Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system configured to be incorporated in a vehicle, the system comprising:
   a communication system including a text messaging communication hardware to receive a message via a text messaging service, wherein the message text includes a command and a source identifier; and
   a microcontroller, coupled to the communication system and a machine control system, to execute the command through the machine control system, wherein the machine control system is configured to control components of the vehicle and the microcontroller is configured to determine if, based on the source identifier included in the message, a configuration allows execution of the received command and to return a response to the communication system.

2. The system of claim 1, wherein the message is a Short Text Messaging (SMS) of length less than or equal to 160 characters.

3. The system of claim 2, wherein based on the command, the microcontroller is configured to execute a diagnostic operation through the machine control system and return results of the diagnostic operation to a sender of the command via an SMS.

4. The system of claim 1, further including a Global Positioning System (GPS) hardware, wherein based on the command, with the help of the GPS hardware, the microcontroller is configured to send the current position of the vehicle to the sender of the message via text messaging service.

5. The system of claim 1, wherein the message includes a command to retrieve status parameters of the vehicle, wherein the status parameters include information associated with at least one of door locks, window position, tire pressure, headlight on or off, security system on or off, temperature inside the vehicle and fuel remaining.

6. The system of claim 1, wherein the message includes the command to turn on or off the vehicle.

7. The system of claim 1, wherein at least a part of the message is encoded and the microcontroller is configured to parse the message to retrieve the command.

8. The system of claim 1, wherein the microcontroller is configured to verify the identity of a sender of the message and execute a pre-configured security rule on the message prior to executing the command that is embodied in the message.

9. The system of claim 8, wherein the microcontroller is configured not to send a return message to the sender in response to the message if the pre-configured security rule determines that the sender is not authorized to execute the command.

10. The system of claim 9, wherein the microcontroller is configured to send a failure message to the sender in response to the message if the microcontroller is unable to execute the command sent by the sender.

11. The system of claim 9, wherein the microcontroller is configured to send a failure message to the sender in response to the message if the microcontroller is unable to retrieve requested data according to the command from the machine control system.

12. The system of claim 1, wherein the communication system includes a Global System for Mobile Communication/General Packet Radio Service (GSM/GPRS) module.

13. The system of claim 12, wherein the GPS module and the GSM/GPRS module are fabricated on a same semiconductor chip.

14. The system of claim 12, wherein the GPS module, the GSM/GPRS module and the microcontroller are fabricated on a same semiconductor chip.

15. A computer program product comprising program code stored in a non-transitory computer readable medium other than a signal per se, the program code being executable by a processor of an automobile control system to cause the automobile control system to implement an operation, the operation comprising:

receiving a Short Messaging Service (SMS) message, wherein a first portion of message characters of the SMS message are a source identifier and the remaining characters include a request for performing a task;

determining if the request is sent by an authorized sender by comparing the source identifier with known identifiers of authorized senders;

determining if a configuration of the automobile control system that is embodied in a automobile can execute the requested task by querying the automobile control system;

upon determining that the request is sent by the authorized sender and that the automobile control system can execute the requested task, executing the task through the automobile control system that is configured to monitor and control components of the automobile; and sending results of the task back to the authorized sender in the form of an SMS message.

16. The method of claim 15, wherein the task includes running a predefined diagnostic sequence through the control system.

* * * * *